May 20, 1958  J. FAVEY  2,835,105
ELECTROSTATIC BALANCE CLOCK
Filed May 24, 1954
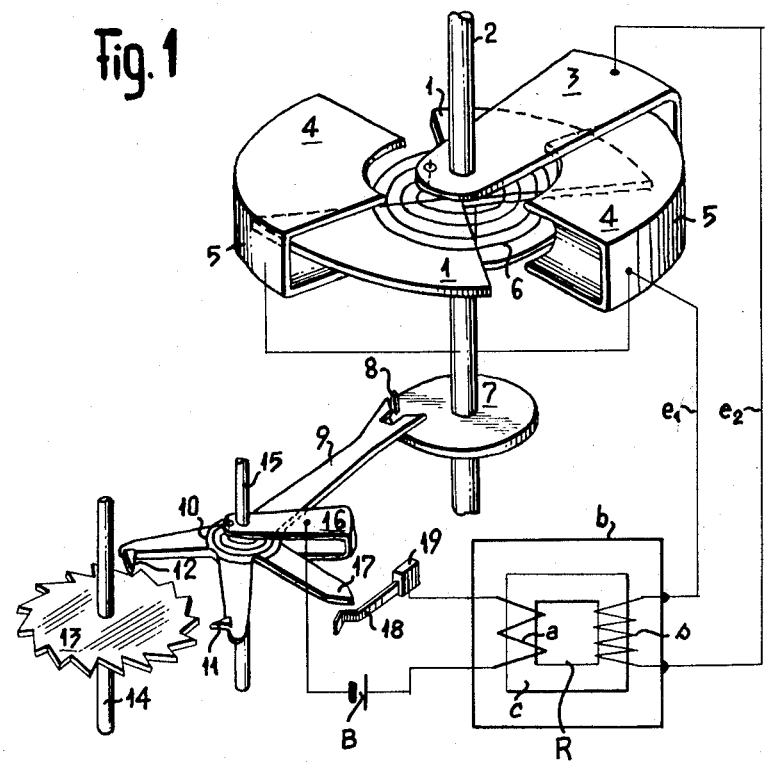
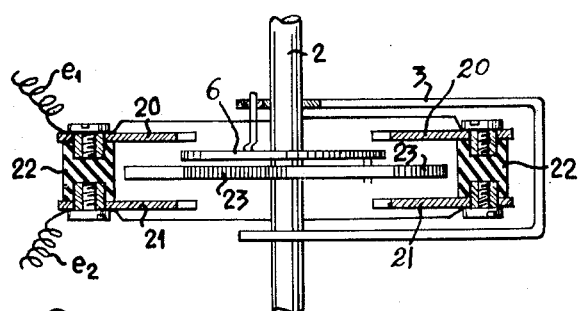
INVENTOR
JACQUES FAVEY
By: Young, Emery & Thompson
Attys.

United States Patent Office 2,835,105
Patented May 20, 1958

2,835,105

ELECTROSTATIC BALANCE CLOCK

Jacques Favey, Geneva, Switzerland, assignor to Ancienne Manufacture d'Horlogerie, Patek Philippe & Co. S. A., Geneva, Switzerland, a corporation of Switzerland Application May 24, 1954, Serial No. 431,959

Claims priority, application Switzerland June 2, 1953

7 Claims. (Cl. 58—28)

There exist many devices and installations for the electric maintenance of the running of a clockwork. However, notwithstanding all the improvements made, none of the known installations gives complete satisfaction, particularly when a clockwork of middle or little size (small clock, pocket clock, wrist watch) should be driven. This is due to the fact that the proposed installations are always provided with electromagnetic maintenance devices. The magnetic field is a cause of perturbations in the regulating members of the clockwork and besides the efficiency of these electromagnetic devices is very low, by reason of the great magnetic losses.

The present invention has for an object an installation for the electric maintenance of the running of a clockwork which tends to overcome these drawbacks by the fact that it comprises on the one hand an electrostatic motor having at least one fixed armature and an oscillating equipment provided with at least one armature rigidly fastened to an axis subject to the action of a spiral spring tending to maintain said equipment in an unstable electric position of equilibrium and on the other hand a generator of electric impulses connected to at least two of said armatures and creating at regular time intervals a momentary voltage difference between two of said armatures.

The attached drawing shows schematically and by way of example two embodiments of an electric maintenance installation in accordance with the invention.

Fig. 1 is a perspective view, partly schematic, of a maintenance installation comprising an electrostatic motor and illustrates one embodiment of the invention.

Fig. 2 is a cross-sectional view of a second embodiment of the motor of the invention.

According to the embodiment illustrated in Fig. 1, the maintenance installation comprises a pair of mobile armatures 1 each comprising only one electrode rigidly fastened on a shaft 2. Said shaft 2 turns in bearings provided in a fixed part 3.

The armatures 1 are fastened symmetrically on both sides of the shaft 2. Two sets of fixed armatures 4 are disposed symmetrically around the shaft 2. These fixed armatures 4 lie in planes perpendicular to the shaft 2 and each comprises two electrodes electrically connected one to the other by means of a cylindrical wall 5. These armatures 4 are fastened on side plates of the clockwork by means of an insulating carrier (not shown).

A spiral spring 6 tends to maintain said shaft 2 in a neutral position. When the shaft 2 is in the neutral position as determined by the spring 6, the mobile armatures 1 are out of the electrically neutral position with respect to fixed armatures 4. This is due to the fact that armatures 4 are mounted in positions which are equally angularly displaced from the electrically neutral position with respect to mobile armatures 1 when the armatures 1 are in the neutral position determined by the spring 6.

A disk 7 fastened to the shaft 2 carries a pin 2 cooperating with the rear end of a swinging lever 9. Said lever is subjected to the action of a spring 10 and carries a retaining stop 11 and an escapement stop 12 cooperating with an escapement wheel 13, the shaft 14 of which carries the first wheel (not illustrated) of the clockwork.

The swinging lever 9 comprises a shaft 15 revolving in bearings provided in a fixed part 16. A finger 17 carried by said swinging lever cooperates with a flexible blade 18 fastened to an intermediate piece 19 fastened to one of the said side plates of the clockwork, but electrically insulated from said side plate by means of any known means (not shown).

Said finger 17 and said blade 18 constitute a current breaker inserted in an electric circuit comprising a battery B and the primary winding $a$ of a voltage transformer R. The secondary winding $s$ of said transformer is connected on the one hand to two sets of fixed armatures 4 by means of a lead $e_1$ and on the other hand to the mobile armatures 1 by means of a lead $e_2$, the fixed part 3 and the spiral spring 6. The transformer R, provided with a closed magnetic circuit $c$, is located inside a screening $b$.

If the device is at rest, the spring 6 tends to maintain the mobile armatures in neutral position. Now, if these fixed and mobile armatures are electrically loaded at different voltages, this (spring) neutral position corresponds to the position of greatest electric energy and thus to an unstable electric position of equilibrium. It follows, that the littlest angular displacement of the shaft 2 will drive said mobile armatures until the position of littlest electric energy for which said mobile armatures are located inside said fixed armatures. In the represented example, the two positions of littlest energy are located at 90° on both sides of the position of greatest energy.

When the shaft 2 oscillates, it causes the lever 9 to rotate on its shaft 15. The finger 17 will engage the blade 18 and close the supply circuit for the primary $a$ of the transformer R. This occurs at the instant the mobile armatures 1 pass the position of mechanical (spring) equilibrium. The shaft 2 continues its movement, causing lever 9 to rotate further, and the breaking of the contact between finger 17 and blade 18, thus opening the supply circuit for the primary $a$ of transformer R. This causes an impulse of high tension and of short duration in the secondary $s$ of the transformer R. This impulse of current charges electrically the armatures of the electrostatic motor. These armatures are drawn to each other during the duration of the impulse, then continue their oscillating movement, braked by the spring 6; the armatures are stopped, and their direction of rotation reversed. Shaft 2 is then accelerated by the action of the spring 6, and when it passes through its neutral position, the finger 17 closes the supply circuit for the transformer primary, and then opens this circuit. A new high tension impulse of short duration is generated upon this circuit opening, and during the emission of this impulse, the mobile armatures receive another impulse to sustain their motion.

By choosing the value of the voltage applied on the electrodes of the armatures 1 and 4, the distance between said electrodes, the duration during which the voltage is applied on said electrodes and the precise moment at which said electric impulse is emitted in relation to the oscillatory movement of the oscillating equipment, it is possible to maintain a regular oscillating movement by means of a very little consumption of energy.

Indeed, in the driving device described which constitutes in fact an electrostatic motor, the losses are merely reduced to the electric losses and to the mechanical friction losses of the members of the mobile equipment and of the regulating members. Those skilled in the art know that these losses may be rendered practically negligible. The efficiency of the described motor device is thus much greater than that of the known electromagnetic devices.

With the described installation, it is possible to reduce in large measure the capacity of the source of energy. Practical tests have shown that it is possible to maintain the oscillatory movement by means of voltage impulses of about 600 volts and of a duration of 5/1000 second. It is to be noted that said duration of the impulses are of at least 2/1000 littler than the duration of the impulses necessary for the working of the best known devices. This constitutes also a great advantage of the described device and is the reason for a very great precision in the regulation.

The described maintenance device is merely an electrostatic one, for this device uses as driving energy only the electrical field created between the electrodes of a condenser. Consequently, said device eliminates completely all the drawbacks of the known electric clockworks due to the magnetic field of dispersion of their electromagnetic maintenance device. The described maintenance device allows the use of compensation spiral springs and in a general manner to use for each workpiece the metal or the ferromagnetic or non ferromagnetic alloy which is the more adapted for the working of said workpiece.

In another form of execution, the maintenance device could be fed by means of a voltage transformer provided with a magnetic circuit made of a high quality material (agglomerated ferromagnetic powder) and in the shape of a torus. The magnetic flux of dispersion of such a transformer is practically nil and if said torus is housed in an antimagnetic screening, it will be clear that outside there will not exist any disturbing magnetic field, which could be prejudicial for the good working of the clockwork.

The fixed and mobile armatures may be of any desired number. However, it is of advantage to have an even number of mobile armatures in order to allow an easy counterbalancing of the mobile equipment of the oscillating motor.

Each fixed and mobile armature may comprise any number of electrodes, which interpenetrate in the manner of the electrodes of the armatures of a variable condenser.

In the embodiment shown in Fig. 2, the electrostatic motor comprises, on the one hand, two pairs of fixed armatures comprising each one electrode 20 and 21 electrically insulated one from the other by means of distance-pieces 22, and on the other hand, a pair of mobile armatures each comprising only one electrode 23, fastened onto the oscillating shaft 2.

The electrodes 20 and 21 are connected to the winding of the transformer R by means of the leads $e_1$ and $e_2$ which correspond to leads $e_1$ and $e_2$ of Fig. 1. Said four fixed armatures are fastened rigidly to the side-plates of the clockwork, but are electrically insulated from said side-plates by any known means.

This embodiment presents the advantage that the mobile equipment, and particularly the spiral spring is not under voltage. However, the impulsion which the mobile equipment undergoes at each half period of its oscillating movement is weaker than in the case of Fig. 1 for according to Fig. 2 said impulsion results only of the capacity variation of the condenser formed by the electrodes 20 and 21, and caused by the penetration of the mobile electrode 23 between said two fixed electrodes 20 and 21 set at different voltages.

Practical tests have shown however that said form of execution of the electrostatic motor provides also the continued running of the clockwork.

The generator of impulses may be substituted by any other known generator of impulses, such as an electronic generator built up with tubes or transistors for instance, and controlled by means of a quartz crystal oscillator built up with tubes or transistors, or by means of the current breaker 17, 18 or by a system of transistors working as a current breaker. In this case, the duration of the electric impulses and the precise moment of their emission may be modified and choosen at will.

The generator of electric impulses may also be constituted, on the one hand, by a source of high voltage such as a Volta battery, or a high voltage source having a radioactive element (of which one of the poles is constituted by a radio-active element, while the second pole is constituted by a metal screen bombarded by said element) for instance, and on the other hand by a current breaker controlled by the oscillating movement of the axis 2 and connecting momentarily said high voltage source with the electrodes of the electrostatic motor.

In a variant, the finger 17 could be fastened to the axis 2 and the oscillating equipment of the electrostatic motor could be provided with retaining and escapement stops cooperating with an escapement wheel in such a manner as to constitute simultaneously, the rotor of said oscillating motor and the oscillating part of the regulating members.

Many other forms of execution of the described installation may be foreseen without departing from the scope of the appended claims. The main character of the invention being constituted however by the fact that the installation for the electric maintenance of the running of a clockwork comprises an oscillating electrostatic motor, and a generator of electric impulses of very short duration. Said impulses may be applied on the armatures of said motor as described once during each half period of the oscillatory movement of said motor, or only once during each period, or also only once each twice, third or any other whole number of half periods of said oscillatory movement. However, said voltage impulses should always be applied onto said motor at even time intervals.

I claim:

1. An apparatus for supplying energy to a clockwork comprising an oscillatable shaft, armatures symmetrically fastened to said shaft for movement therewith, a spring acting on said shaft and tending to maintain said armatures in a rest position, fixed armatures disposed adjacent said shaft, said fixed armatures being symmetrically displaced from the rest position of said first mentioned armatures, an actuating member fastened to said shaft, a lever mounted for oscillation by said actuating member, a switch controlled by said lever, and a high voltage generator controlled by said switch and the high voltage output of which is electrically connected respectively to said fixed and oscillatable armatures, whereby said high voltage generator emits electric impulses of short duration.

2. An apparatus for supplying energy to a clockwork comprising an oscillatable shaft, armatures fastened symmetrically on said shaft, a spiral spring acting on said shaft, fixed armatures disposed around said shaft and symmetrically in relation to a rest position of said movable armatures, whereby said fixed and movable armatures constitute an electrostatic motor, a high voltage source connected to the armatures of said electrostatic motor, an actuating member rigidly fastened to said shaft, a swinging lever controlled by said actuating member, whereby said movable armatures with said shaft constitute simultaneously the oscillatory part of said electrostatic motor and the balance-wheel of regulating means of said clockwork, a switch controlled by said swinging lever and controlling said high voltage source for the periodic emission of electric impulses of very short duration.

3. An installation as claimed in claim 2 and in which said high voltage source comprises a high voltage transformer, said switch being in the feeding circuit of said transformer.

4. An installation as claimed in claim 3 and in which the actuation of said lever causes the closing of said switch approximately when said movable armatures pass through the rest position.

5. An installation as claimed in claim 3 and in which said shaft carries two armatures each comprising one electrode, two fixed armatures each comprising two electrodes, all the electrodes of said fixed armatures being electrically interconnected and connected to one of the poles of the output of said transformer, the second pole of said output being connected to said movable armatures.

6. An apparatus for supplying energy to a clockwork, comprising an oscillatable shaft, armatures fastened symmetrically on said shaft, a spiral spring acting on said shaft, first and second fixed armatures disposed around said shaft and symmetrically in relation to a rest position of said oscillatable armatures, said two fixed armatures comprising each two electrodes insulated one from the other, one electrode of one fixed armature being electrically connected to one electrode of the second armature, and forming a first pair of fixed electrodes, and the second electrode of said first armature being electrically connected to the second electrode of said second armature and forming a second pair of fixed electrodes, whereby said oscillatable and fixed armatures constitute an electrostatic motor, a high voltage source, the poles of which are electrically connected respectively to said first and second pairs of electrodes, an actuating member, rigidly fastened to said shaft, a swinging lever controlled by said actuating member, whereby said movable armatures with said shaft and said first and second pairs of fixed electrodes constitute simultaneously an electrostatic motor and the balance wheel of regulating means of said clockwork, and a switch controlled by said swinging lever and controlling said high voltage source for the periodic emission of electric impulses of very short duration.

7. An apparatus for supplying energy to a clockwork comprising an oscillatable shaft, armatures symmetrically fastened to said shaft for movement therewith, a spring acting on said shaft and tending to maintain said armatures in a rest position, fixed armatures disposed adjacent said shaft, said fixed armatures being symmetrically displaced from the rest position of said first-mentioned armatures, an actuating member fastened to said shaft, a lever mounted for oscillation by said actuating member, a switch, actuating means operatively connected between said shaft and said switch for operation of said switch upon oscillation of said shaft, a high voltage generator controlled by said switch, and means connecting the high voltage output of said generator to said fixed and oscillatable armatures, whereby said high voltage generator emits electric impulses of short duration.

References Cited in the file of this patent
UNITED STATES PATENTS

| | | |
|---|---|---|
| 750,492 | Schmidt | Jan. 26, 1904 |
| 1,910,434 | Hayes | May 23, 1933 |
| 2,625,787 | Reiner | Jan. 20, 1953 |